United States Patent
Dansereau et al.

(10) Patent No.: US 10,247,106 B2
(45) Date of Patent: Apr. 2, 2019

(54) METHOD AND SYSTEM FOR ROTATING AIR SEAL WITH INTEGRAL FLEXIBLE HEAT SHIELD

(71) Applicant: General Electric Company, Schenectady, NY (US)

(72) Inventors: Michael Thomas Dansereau, West Chester, OH (US); Kyle Robert Snow, Loveland, OH (US)

(73) Assignee: General Electric Company, Schenectady, NY (US)

( * ) Notice: Subject to any disclaimer, the term of this patent is extended or adjusted under 35 U.S.C. 154(b) by 376 days.

(21) Appl. No.: 15/183,046

(22) Filed: Jun. 15, 2016

(65) Prior Publication Data
US 2017/0363011 A1    Dec. 21, 2017

(51) Int. Cl.
*F02C 7/24* (2006.01)
*F02C 7/28* (2006.01)
(Continued)

(52) U.S. Cl.
CPC ............... *F02C 7/28* (2013.01); *F01D 25/12* (2013.01); *F01D 25/183* (2013.01); *F01D 25/32* (2013.01);
(Continued)

(58) Field of Classification Search
CPC ...... F02C 7/28; F02C 3/06; F02C 7/24; F01D 25/12; F01D 25/183; F01D 25/32;
(Continued)

(56) References Cited

U.S. PATENT DOCUMENTS 2,544,538 A * 3/1951 Mahnken ............... F02K 1/822
126/39 M
2,722,801 A * 11/1955 Lombard ................ F02K 1/11
239/127.3
(Continued)

FOREIGN PATENT DOCUMENTS

EP       0752052 B1    5/2000
EP       1 905 963 A2  4/2008
(Continued)

OTHER PUBLICATIONS

Extended European Search Report and Opinion issued in connection with corresponding EP Application No. 17164130.1 dated Nov. 7, 2017.
(Continued)

*Primary Examiner* — Logan M Kraft
*Assistant Examiner* — Brian Christopher Delrue
(74) *Attorney, Agent, or Firm* — General Electric Company; Pamela Kachur

(57) ABSTRACT

An apparatus and method of reducing a flow of fluid and heat between a first space and a second space in a rotatable machine and an integral seal and heat shield device are provided. The device includes an annular flange configured to couple to the rotating member of the rotatable machine and a multi-walled seal shield member extending axially from the flange. The multi-walled seal shield member is formed integrally with the flange. The seal shield member includes a first wall including a plurality of surface features, a second wall spaced radially inwardly with respect to the first wall, and a cavity formed between the first and second walls. The integral seal and heat shield device also includes a cap end integrally formed and configured to seal the first and second walls. Each of the flange, the seal shield member, and the cap end are formed of a sintered metal.

21 Claims, 6 Drawing Sheets

(51) Int. Cl.
  *F02C 3/06* (2006.01)
  *F01D 25/12* (2006.01)
  *F01D 25/18* (2006.01)
  *F01D 25/32* (2006.01)
  *F01D 5/02* (2006.01)

(52) U.S. Cl.
  CPC .................. *F02C 3/06* (2013.01); *F02C 7/24* (2013.01); *F01D 5/025* (2013.01); *F05D 2220/32* (2013.01); *F05D 2230/22* (2013.01); *F05D 2230/50* (2013.01); *F05D 2240/35* (2013.01); *F05D 2240/63* (2013.01); *F05D 2250/25* (2013.01); *F05D 2260/231* (2013.01); *F05D 2260/602* (2013.01); *F05D 2260/608* (2013.01); *F05D 2260/609* (2013.01); *F05D 2260/6022* (2013.01); *F05D 2260/97* (2013.01); *F05D 2300/175* (2013.01); *Y02T 50/675* (2013.01)

(58) Field of Classification Search
  CPC ........ F01D 5/025; F01D 25/08; F01D 25/145; F01D 5/08; F01D 11/02; F01D 11/025; F01D 11/00; F05D 2220/32; F05D 2230/22; F05D 2230/50; F05D 2240/35; F05D 2240/63; F05D 2250/25; F05D 2260/231; F05D 2260/602; F05D 2260/6022; F05D 2260/608; F05D 2260/609; F05D 2260/97; F05D 2240/55; F05D 2300/175; F05D 2230/31; F05D 2230/312; Y02T 50/675; F23R 2900/00012; B33Y 10/00; B33Y 80/00
  See application file for complete search history.

(56) References Cited

U.S. PATENT DOCUMENTS

| | | | | |
|---|---|---|---|---|
| 3,262,264 A * | 7/1966 | O'Neill | ............ | F02K 1/08 239/127.3 |
| 3,939,653 A * | 2/1976 | Schirmer | ............ | F23R 3/005 60/39.511 |
| 4,009,569 A * | 3/1977 | Kozlin | ............ | F01D 25/16 60/39.37 |
| 4,365,470 A * | 12/1982 | Matthews | ............ | F23R 3/283 60/740 |
| 4,920,742 A * | 5/1990 | Nash | ............ | F01D 25/162 415/116 |
| 5,174,714 A * | 12/1992 | Plemmons | ............ | F01D 25/145 29/888.01 |
| 5,253,471 A * | 10/1993 | Richardson | ............ | F23R 3/10 60/754 |
| 5,312,227 A * | 5/1994 | Grateau | ............ | F01D 9/065 415/142 |
| 5,429,478 A | 7/1995 | Krizan et al. | | |
| 5,605,438 A * | 2/1997 | Burdgick | ............ | F01D 25/145 415/182.1 |
| 6,298,667 B1 * | 10/2001 | Glynn | ............ | F23R 3/002 29/889.2 |
| 6,638,013 B2 * | 10/2003 | Nguyen | ............ | F01D 9/065 415/115 |
| 6,901,757 B2 | 6/2005 | Gerendas | | |
| 7,735,833 B2 * | 6/2010 | Braun | ............ | F01D 11/003 277/301 |
| 7,955,446 B2 * | 6/2011 | Dierberger | ............ | B23K 31/00 148/400 |
| 8,057,924 B2 * | 11/2011 | Kaiser | ............ | F01D 5/288 416/241 B |
| 8,092,161 B2 * | 1/2012 | Cai | ............ | F01D 25/145 415/114 |
| 8,099,960 B2 * | 1/2012 | Elkady | ............ | F23R 3/14 60/737 |
| 8,245,518 B2 * | 8/2012 | Durocher | ............ | F01D 9/065 415/142 |
| 8,500,392 B2 * | 8/2013 | Durocher | ............ | F01D 9/06 415/116 |
| 9,303,528 B2 * | 4/2016 | Sanchez | ............ | F01D 9/065 |
| 9,683,456 B2 * | 6/2017 | Burmester | ............ | F02C 6/12 |
| 9,850,774 B2 * | 12/2017 | Vo | ............ | F02C 7/28 |
| 9,903,224 B2 * | 2/2018 | Scott | ............ | F01D 9/065 |
| 10,053,998 B2 * | 8/2018 | Vo | ............ | F01D 9/065 |
| 10,060,279 B2 * | 8/2018 | Vo | ............ | F01D 11/001 |
| 10,072,845 B2 * | 9/2018 | Mook | ............ | F23R 3/14 |
| 2002/0108379 A1 * | 8/2002 | Akiyama | ............ | F01D 5/085 60/806 |
| 2003/0025274 A1 * | 2/2003 | Allan | ............ | F01D 11/005 277/355 |
| 2003/0042682 A1 * | 3/2003 | Inoue | ............ | F16J 15/3288 277/355 |
| 2006/0105160 A1 * | 5/2006 | Berndt | ............ | C23C 8/04 428/323 |
| 2007/0125093 A1 * | 6/2007 | Burd | ............ | F23R 3/04 60/804 |
| 2008/0016876 A1 * | 1/2008 | Colibaba-Evulet | ............ | F02C 9/40 60/776 |
| 2008/0115501 A1 * | 5/2008 | Elkady | ............ | F23R 3/14 60/776 |
| 2008/0163627 A1 * | 7/2008 | ELKady | ............ | F23D 14/62 60/737 |
| 2008/0223835 A1 * | 9/2008 | Kuhn | ............ | B23K 26/0823 219/121.71 |
| 2008/0236169 A1 * | 10/2008 | Hawie | ............ | F23R 3/002 60/779 |
| 2008/0276621 A1 * | 11/2008 | Somanath | ............ | F01D 25/162 60/796 |
| 2010/0095679 A1 * | 4/2010 | Rudrapatna | ............ | F23R 3/005 60/752 |
| 2010/0132371 A1 * | 6/2010 | Durocher | ............ | F01D 9/065 60/796 |
| 2011/0081240 A1 * | 4/2011 | Durocher | ............ | F01D 9/044 415/209.3 |
| 2011/0244264 A1 * | 10/2011 | Anton | ............ | B23K 1/0018 428/613 |
| 2012/0047905 A1 * | 3/2012 | Rauch | ............ | F01D 25/14 60/752 |
| 2012/0234013 A1 * | 9/2012 | Overman | ............ | F23C 9/006 60/772 |
| 2012/0243970 A1 * | 9/2012 | Hellgren | ............ | F01D 5/187 415/1 |
| 2014/0007588 A1 * | 1/2014 | Sanchez | ............ | F01D 9/065 60/796 |
| 2014/0056685 A1 * | 2/2014 | Duelm | ............ | F01D 25/08 415/1 |
| 2014/0093371 A1 * | 4/2014 | Vo | ............ | F02C 7/24 415/214.1 |
| 2014/0161598 A1 | 6/2014 | Hanley et al. | | |
| 2014/0338351 A1 * | 11/2014 | Snyder | ............ | F23R 3/12 60/772 |
| 2015/0069148 A1 | 3/2015 | Ryon et al. | | |
| 2015/0128602 A1 | 5/2015 | Clemen | | |
| 2015/0198063 A1 | 7/2015 | Laletin et al. | | |
| 2015/0226433 A1 * | 8/2015 | Dudebout | ............ | F23R 3/16 60/752 |
| 2015/0241063 A1 * | 8/2015 | Bangerter | ............ | F23R 3/002 60/754 |
| 2015/0252689 A1 * | 9/2015 | Burmester | ............ | F02C 6/12 415/177 |
| 2015/0285095 A1 * | 10/2015 | Yeager | ............ | F01D 25/30 415/1 |
| 2015/0292743 A1 * | 10/2015 | Mook | ............ | F23R 3/14 60/806 |
| 2015/0330244 A1 * | 11/2015 | Vo | ............ | F01D 9/065 415/173.5 |
| 2015/0330249 A1 * | 11/2015 | Budnick | ............ | F01D 25/12 415/116 |
| 2015/0337682 A1 * | 11/2015 | Yeager | ............ | F01D 9/065 415/1 |
| 2015/0354406 A1 | 12/2015 | Farris et al. | | |

(56) References Cited

U.S. PATENT DOCUMENTS

| | | | |
|---|---|---|---|
| 2015/0354410 A1* | 12/2015 | Budnick | F01D 25/28 415/177 |
| 2015/0369074 A1* | 12/2015 | Faulder | F01D 25/186 415/174.5 |
| 2016/0003082 A1 | 1/2016 | Lutjen et al. | |
| 2016/0032763 A1 | 2/2016 | Grogg et al. | |
| 2016/0102568 A1* | 4/2016 | Grant | F01D 9/065 415/115 |
| 2016/0102577 A1* | 4/2016 | Grant | F01D 9/042 415/1 |
| 2016/0123187 A1* | 5/2016 | Leslie | F01D 25/145 415/134 |
| 2016/0146049 A1* | 5/2016 | Lemoine | F01D 9/065 415/182.1 |
| 2016/0146052 A1* | 5/2016 | McGinnis | F01D 21/045 415/200 |
| 2016/0153296 A1* | 6/2016 | Ols | F01D 5/082 415/1 |
| 2016/0201909 A1* | 7/2016 | Bangerter | F02C 3/14 60/772 |
| 2016/0245518 A1* | 8/2016 | Drake | F02C 7/24 |
| 2016/0273453 A1* | 9/2016 | Frish | F02C 7/14 |
| 2016/0290643 A1* | 10/2016 | Cunha | F02C 7/12 |
| 2016/0313005 A1* | 10/2016 | Chang | F23R 3/002 |
| 2017/0248078 A1* | 8/2017 | Hannwacker | F02C 7/18 |
| 2018/0038593 A1* | 2/2018 | Quach | F02C 3/04 |
| 2018/0135517 A1* | 5/2018 | Mook | F02C 3/14 |

FOREIGN PATENT DOCUMENTS

| | | | |
|---|---|---|---|
| EP | 2743449 A2 | 6/2014 | |
| EP | 2894301 A1 | 7/2015 | |
| EP | 3 026 222 A1 | 6/2016 | |
| JP | 2005-036802 A | 2/2005 | |
| JP | 2005098678 A * | 4/2005 | F23R 3/002 |
| JP | 2007-198374 A | 8/2007 | |
| JP | 2015-503045 A | 1/2015 | |
| WO | 2013163398 A1 | 10/2013 | |
| WO | 2015/034636 A1 | 3/2015 | |
| WO | 2015042089 A1 | 3/2015 | |
| WO | 2015084550 A1 | 6/2015 | |
| WO | 2015112385 A1 | 7/2015 | |

OTHER PUBLICATIONS

Machine Translation and Notification of Reasons for Refusal issued in connection with corresponding JP Application No. 2017-073366 dated May 8, 2018.

* cited by examiner

METHOD AND SYSTEM FOR ROTATING AIR SEAL WITH INTEGRAL FLEXIBLE HEAT SHIELD

STATEMENT REGARDING FEDERALLY SPONSORED RESEARCH & DEVELOPMENT

This invention was made with Government support under contract number FA8650-09-D-2922 awarded by the United States Air Force. The Government may have certain rights in this invention.

BACKGROUND

The field of the disclosure relates generally to gas turbine engines and, more particularly, to a method and system for shielding gas turbine engine components from the effects of heat.

At least some known gas turbine engines attempt to extend component life and/or improve performance characteristics of the gas turbine engine by sealing certain areas in the gas turbine engine from other areas. For example, some areas of the gas turbine engine contain heat generating components and adjacent areas may contain heat sensitive components. The life of the heat sensitive components may be extended if the components were shielded from the heat generated by the heat generating components. Similarly, some areas of the gas turbine engine receive a fluid for lubrication or cooling of components therein. Other components may be sensitive to the lubrication and/or cooling fluid. Additionally, such fluid is likely to be scavenged and reused after an amount of conditioning. Separating such components or containing the fluid to facilitate scavenging is sometimes accomplished using seals and/or shields. Such shields are typically formed of metal pressed into a desired shape and paired with another pressed metal component to form the desired characteristics. Such shields may require the use of dampers to compensate for the relative lack of stiffness in the pressed metal construction. Such construction increase a part count and complexity of the forming the shields. The additional part count also increases a weight of the shield.

BRIEF DESCRIPTION

In one aspect, an integral seal and heat shield device for use in a rotatable machine including a rotatable member having a longitudinal axis of rotation includes an annular flange configured to couple to the rotating member of the rotatable machine and a multi-walled seal shield member extending axially from the flange. The multi-walled seal shield member is formed integrally with the flange. The seal shield member includes a first wall including a plurality of surface features, a second wall spaced radially inwardly with respect to the first wall, and a cavity formed between the first and second walls. The integral seal and heat shield device also includes a cap end integrally formed with and configured to seal the first and the second walls. Each of the flange, the seal shield member, and the cap end formed of a sintered metal.

In another aspect, a method of reducing a flow of fluid and heat between a first space and a second space in a rotatable machine includes forming an annular seal shield of a sintered superalloy material using an additive manufacturing process. The seal shield includes at least one of surface features configured to relieve stress in the seal shield during temperature transients and an oil-running lip configured to direct a flow of oil accumulated on a radially inner surface of the seal shield towards an oil drain opening. The method further includes aligning the seal shield to a rotatable member of the rotatable machine using a lip extending from a radially inner surface of the seal shield and coupling the seal shield axisymmetrically to the rotatable member between the first space and the second space.

In yet another aspect, a gas turbine engine includes a core engine including a multistage compressor, a combustor, and a high pressure (HP) turbine coupled in serial flow relation. The gas turbine engine also includes a low pressure turbine configured to receive combustion exhaust gases from the core engine. A seal and heat shield device is positioned between a relatively low temperature space and a relatively high temperature space within the gas turbine engine. The seal and heat shield device includes an annular radially extending flange configured to couple to the rotating member of the rotatable machine and a multi-walled seal shield member extending axially from the flange. The multi-walled seal shield member is formed integrally with the flange. The multi-walled seal shield member includes a first wall including a plurality of surface features, a second wall spaced radially inwardly with respect to the first wall. The seal shield member further includes a cavity formed between the first and second walls. The seal and heat shield device also includes a cap end integrally formed and configured to seal the first and second walls. Each of the flange, the seal shield member, and the cap end are formed of a sintered metal.

DRAWINGS

These and other features, aspects, and advantages of the present disclosure will become better understood when the following detailed description is read with reference to the accompanying drawings in which like characters represent like parts throughout the drawings, wherein.

Figure 1:
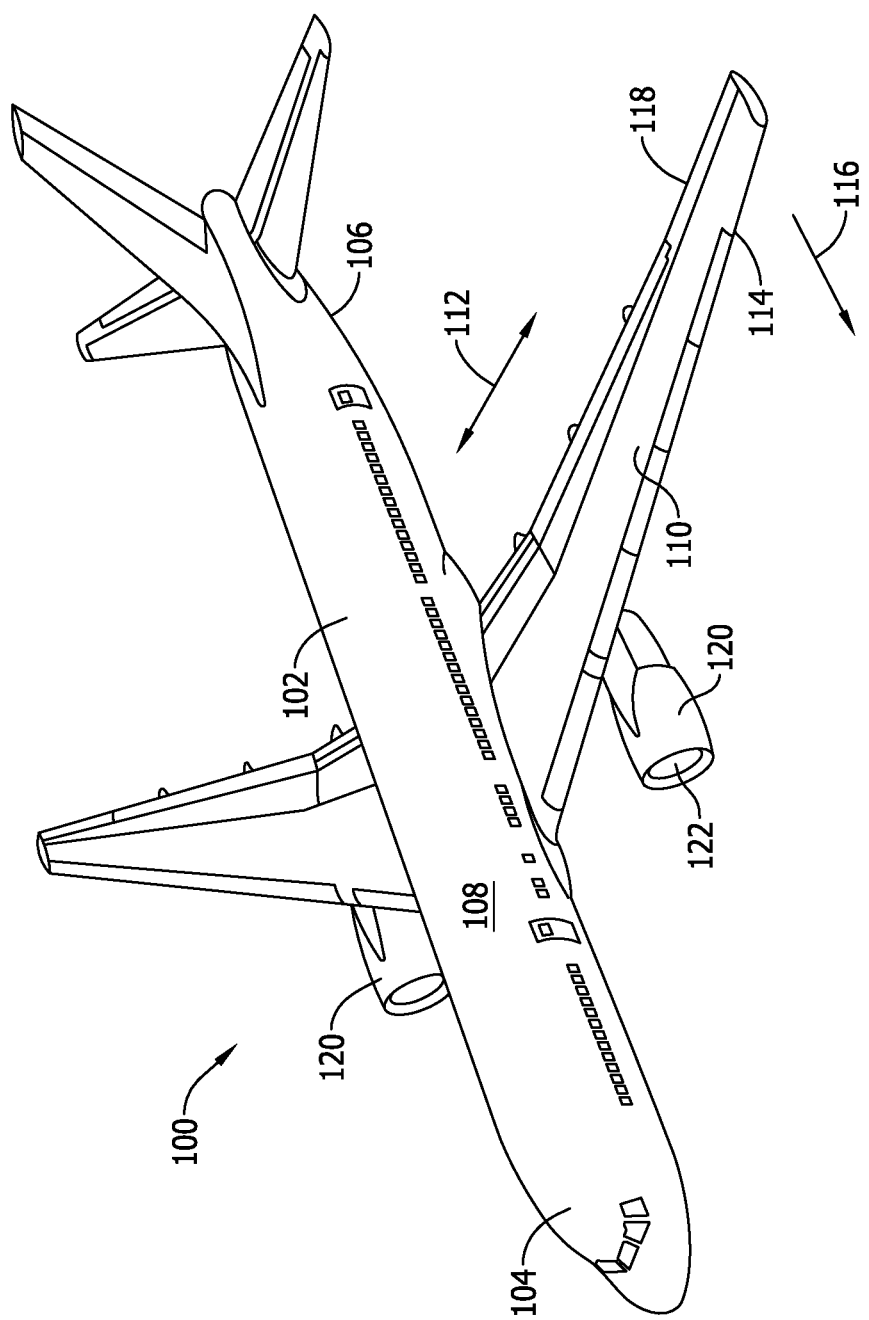
FIG. 1 is a perspective view of an aircraft.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

Embodiments of the rotating air seal with integral flexible heat shield described herein provides a more cost-effective apparatus and method for insulating the oil wetted inner drain cavity surface from the hot air beneath the turbine than is currently available. The air seal and heat shield is an additively manufactured rotating seal with a flexible, integral heat shield that includes an enclosed void or cavity to facilitate insulating the oil wetted inner drain cavity surface from the hot air beneath a turbine portion of a gas turbine engine. The enclosed cavity facilitates reducing a heat transfer from a hot region to a cool region within the gas turbine engine. A wall of the air seal and heat shield component that contacts the hot region includes thermal relief ridges in the shape of a spiral, that allow the wall to expand circumferentially and radially independent from the rest of the air seal and heat shield component at high thermal loads. The integral heat shield is configured to elastically deform under high thermal loads using a spiral shape. Although described as a rotating seal associated with a turbine in a gas turbine engine. The air seal and heat shield describes a single monolithic component configured to be positioned between any hot air region and cool air region to thermally separate the regions.

FIG. 1 is a perspective view of an aircraft 100. In the example embodiment, aircraft 100 includes a fuselage 102 that includes a nose 104, a tail 106, and a hollow, elongate body 108 extending therebetween. Aircraft 100 also includes a wing 110 extending away from fuselage 102 in a lateral direction 112. Wing 110 includes a forward leading edge 114 in a direction 116 of motion of aircraft 100 during normal flight and an aft trailing edge 118 on an opposing edge of wing 110. Aircraft 100 further includes at least one engine 120 configured to drive a bladed rotatable member 122 or fan to generate thrust. Engine 120 is coupled to at least one of wing 110 and fuselage 102, for example, in a pusher configuration (not shown) proximate tail 106.

Figure 2:
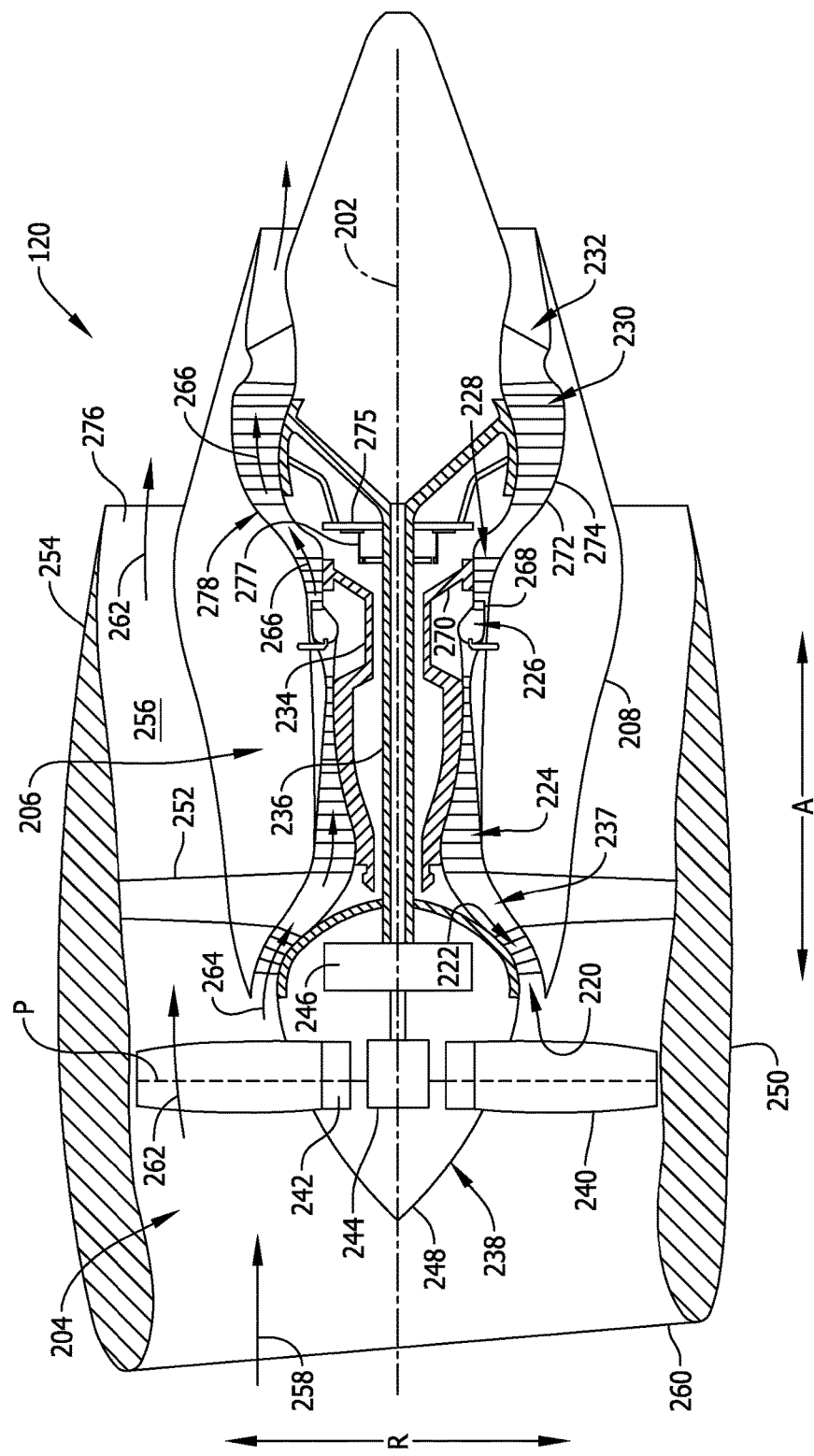
FIG. 2 is a schematic cross-sectional view of the gas turbine engine, shown in FIG. 1, in accordance with an exemplary embodiment of the present disclosure.

FIG. 2 is a schematic cross-sectional view of gas turbine engine 120 in accordance with an exemplary embodiment of the present disclosure. In the example embodiment, gas turbine engine 120 is embodied in a high-bypass turbofan jet engine. As shown in FIG. 2, turbofan engine 120 defines an axial direction A (extending parallel to a longitudinal axis 202 provided for reference) and a radial direction R. In general, turbofan 120 includes a fan assembly 204 and a core turbine engine 206 disposed downstream from fan assembly 204.

In the example embodiment, core turbine engine 206 includes an approximately tubular outer casing 208 that defines an annular inlet 220. Outer casing 208 encases, in serial flow relationship, a compressor section including a booster or low pressure (LP) compressor 222 and a high pressure (HP) compressor 224; a combustion section 226; a turbine section including a high pressure (HP) turbine 228 and a low pressure (LP) turbine 230; and a jet exhaust nozzle section 232. A high pressure (HP) shaft or spool 234 drivingly connects HP turbine 228 to HP compressor 224. A low pressure (LP) shaft or spool 236 drivingly connects LP turbine 230 to LP compressor 222. The compressor section, combustion section 226, turbine section, and nozzle section 232 together define a core air flowpath 237.

In the example embodiment, fan assembly 204 includes a variable pitch fan 238 having a plurality of fan blades 240 coupled to a fan disk 242 in a spaced apart relationship. Fan blades 240 extend radially outwardly from fan disk 242. Each fan blade 240 is rotatable relative to fan disk 242 about a pitch axis P by virtue of fan blades 240 being operatively coupled to a suitable pitch change mechanism (PCM) 244 configured to vary the pitch of fan blades 240. In other embodiments, pitch change mechanism (PCM) 244 is configured to collectively vary the pitch of fan blades 240 in unison. Fan blades 240, fan disk 242, and pitch change mechanism 244 are together rotatable about longitudinal axis 202 by LP shaft 236 across a power gear box 246. Power gear box 246 includes a plurality of gears for adjusting the rotational speed of fan 238 relative to LP shaft 236 to a more efficient rotational fan speed.

Fan disk 242 is covered by rotatable front hub 248 aerodynamically contoured to promote an airflow through the plurality of fan blades 240. Additionally, fan assembly 204 includes an annular fan casing or outer nacelle 250 that circumferentially surrounds fan 238 and/or at least a portion of core turbine engine 206. In the example embodiment, nacelle 250 is configured to be supported relative to core turbine engine 206 by a plurality of circumferentially-spaced outlet guide vanes 252. Moreover, a downstream section 254 of nacelle 250 may extend over an outer portion of core turbine engine 206 so as to define a bypass airflow passage 256 therebetween.

During operation of turbofan engine 120, a volume of air 258 enters turbofan 120 through an associated inlet 260 of nacelle 250 and/or fan assembly 204. As volume of air 258 passes across fan blades 240, a first portion 262 of volume of air 258 is directed or routed into bypass airflow passage 256 and a second portion 264 of volume of air 258 is directed or routed into core air flowpath 237, or more specifically into LP compressor 222. A ratio between first portion 262 and second portion 264 is commonly referred to as a bypass ratio. The pressure of second portion 264 is then increased as it is routed through high pressure (HP) compressor 224 and into combustion section 226, where it is mixed with fuel and burned to provide combustion gases 266.

Combustion gases 266 are routed through HP turbine 228 where a portion of thermal and/or kinetic energy from combustion gases 266 is extracted via sequential stages of HP turbine stator vanes 268 that are coupled to outer casing 208 and HP turbine rotor blades 270 that are coupled to HP shaft or spool 234, thus causing HP shaft or spool 234 to rotate, which then drives a rotation of HP compressor 224. Combustion gases 266 are then routed through LP turbine 230 where a second portion of thermal and kinetic energy is extracted from combustion gases 266 via sequential stages of LP turbine stator vanes 272 that are coupled to outer casing 208 and LP turbine rotor blades 274 that are coupled to LP shaft or spool 236 through a low pressure (LP) disk 275, which drives a rotation of LP shaft or spool 236 and LP compressor 222 and/or rotation of fan 238. A seal shield 277 couples to LP disk 275 to reduce a thermal flow in radial direction R.

Combustion gases 266 are subsequently routed through jet exhaust nozzle section 232 of core turbine engine 206 to provide propulsive thrust. Simultaneously, the pressure of first portion 262 is substantially increased as first portion 262 is routed through bypass airflow passage 256 before it is exhausted from a fan nozzle exhaust section 276 of turbofan 120, also providing propulsive thrust. HP turbine 228, LP turbine 230, and jet exhaust nozzle section 232 at least partially define a hot gas path 278 for routing combustion gases 266 through core turbine engine 206.

Turbofan engine 120 is depicted in the figures by way of example only, in other exemplary embodiments, turbofan engine 120 may have any other suitable configuration including for example, a turboprop engine, a military purpose engine, and a marine or land-based aero-derivative engine.

Figure 3:
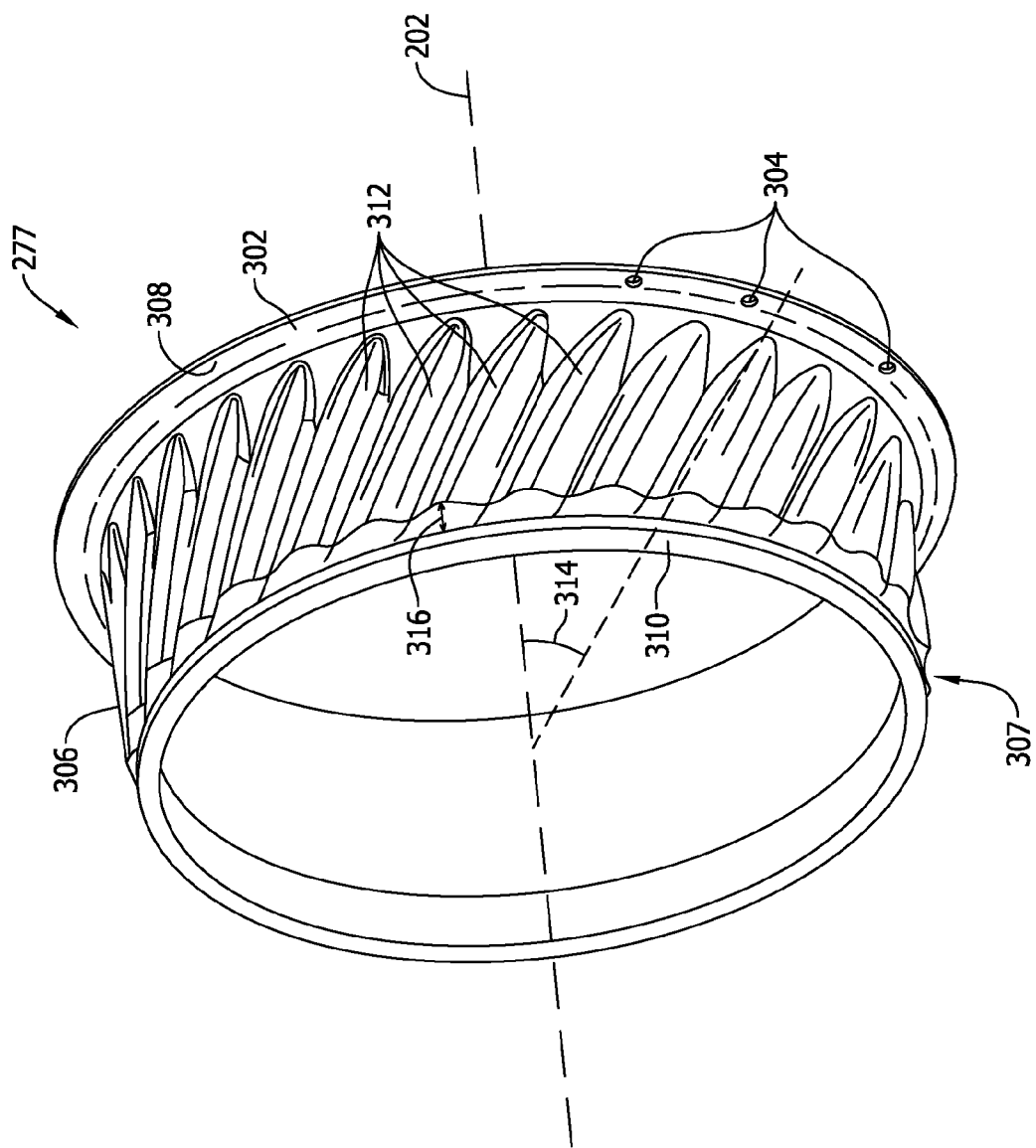
FIG. 3 is a perspective view of the seal shield, shown in FIG. 2, looking from a forward radially outboard perspective.

FIG. 3 is a perspective view of seal shield 277 (shown in FIG. 2) looking from a forward radially outboard perspective. In the example embodiment, seal shield 277 includes an aft annular connection flange 302 that may be used to couple seal shield 277 to, for example, LP disk 275. Seal shield 277 includes a plurality of circumferentially spaced connection points or apertures 304 configured to receive fasteners (not shown) therethrough. Seal shield 277 includes a multi-walled seal shield member 306 that extends axially forward from a forward face 308 of connection flange 302. Seal shield member 306 extends from flange 302 to an axially forward distal end 307. Seal shield member 306 includes a forward cap end 310 that seals a plurality of the walls of multi-walled seal shield member 306. Seal shield 277 is typically substantially cylindrically-shaped and rotationally symmetric about axis 202. However, seal shield 277 may also include more complex shapes to conform with existing components proximate a location where seal shield 277 is positioned.

Seal shield 277 includes a plurality of surface features 312, which may be formed as radially outwardly extending ridges 312, radially inwardly extending troughs, or a combination of ridges and troughs. Surface features 312 provide thermal stress relief for seal shield 277 during temperature transients. In various embodiments, surface features 312 are axially extending ridges and/or troughs. In other embodiments, surface features 312 extend axially and circumferentially, as in a spiral or a helix. Surface features 312 may extend axially at a constant angle 314 with respect to axis 202 or angle 314 may vary with respect to axis 202. A height (or depth) 316 of surface features 312 and angle 314 with respect to axis 202 provide for radial and axial growth of seal shield 277. Each of the height 316, angle 314, and number of surface features 312 can be selected to provide a predetermined amount of growth. In various embodiments, surface features 312 number between three and one-hundred, and can be angled with respect to axis 202 between 0° and 89°. In one embodiment, surface features 312 act as a windage effector, with or without additional fins to increase effect.

In the example embodiment, seal shield 277 is formed unitarily of a sintered metal material, using for example, an additive manufacturing process. In one embodiment, seal shield 277 is formed by an additive manufacturing process. The sintered metal material comprises a superalloy material, such as, but not limited to cobalt chrome and austenite nickel-chromium-based superalloys, and the like. As used herein, "additive manufacturing" refers to any process which results in a three-dimensional object and includes a step of sequentially forming the shape of the object one layer at a time. Additive manufacturing processes include, for example, three dimensional printing, laser-net-shape manufacturing, direct metal laser sintering (DMLS), direct metal laser melting (DMLM), selective laser sintering (SLS), plasma transferred arc, freeform fabrication, and the like. One exemplary type of additive manufacturing process uses a laser beam to sinter or melt a powder material. Additive manufacturing processes can employ powder materials or wire as a raw material. Moreover, additive manufacturing processes can generally relate to a rapid way to manufacture an object (article, component, part, product, etc.) where a plurality of thin unit layers are sequentially formed to produce the object. For example, layers of a powder material may be provided (e.g., laid down) and irradiated with an energy beam (e.g., laser beam) so that the particles of the powder material within each layer are sequentially sintered (fused) or melted to solidify the layer.

Figure 4:
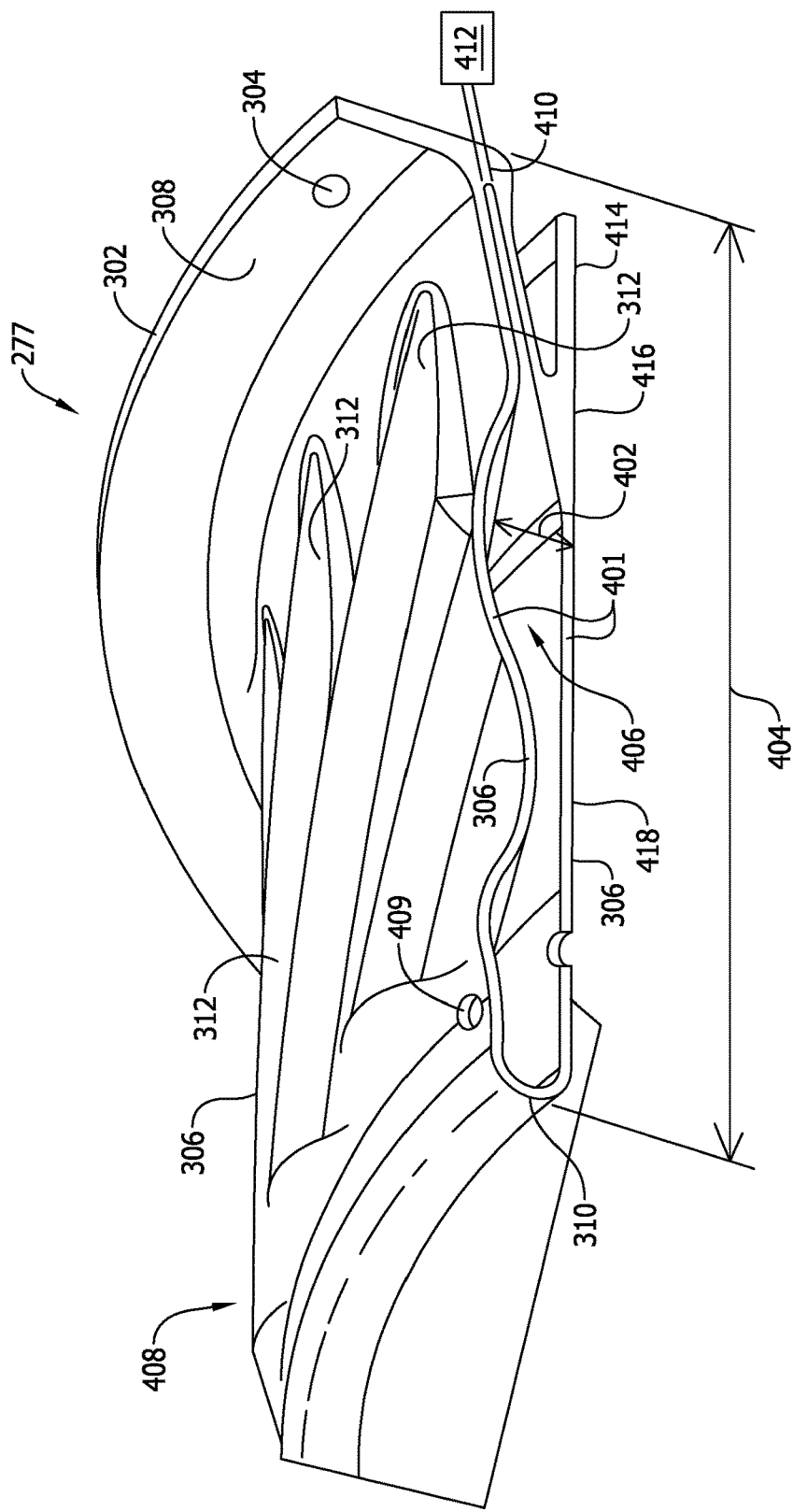
FIG. 4 is a cross-sectional view of the seal shield (shown in FIG. 2) in accordance with an example embodiment of the present disclosure.

FIG. 4 is a cross-sectional view of seal shield 277 in accordance with an example embodiment of the present disclosure. In the example embodiment, multi-walled seal shield member 306 includes two walls 401 spaced radially apart by a predetermined distance 402, which may vary over an axial length 404 of seal shield 277. A cavity 406 is formed between walls 401, which, in the example embodiment, is closed at a forward end 408 by cap end 310 and at an aft end by flange 302. In other embodiments, cavity 406 is closed integrally or open towards a relatively cooler side of seal shield 277. Cavity 406 may be sealed to prevent an exchange of fluid in and/or out of cavity 406, may be vented, using for example, an aperture 409 through one or more of walls 401, may be purged using a purge connection 410 through flange 302 to a purge source 412. Cavity 406 may be sealed under vacuum or filled with an insulative fluid to improve the insulating properties of seal shield 277. Purge source 412 may be embodied in a flow of bleed air from HP compressor 224 or any other source of purge fluid.

An axially extending lip 414 extends from a radially inner surface 416 of a radially inner wall 418 of seal shield member 306 aftward to an axial position approximately equal to flange 302. In other embodiments, axially extending lip 414 may alternatively extend from a radially outer surface of a radially outer wall of seal shield member 306. In various embodiments, lip 414 provides a rabbet load during alignment of flange 402 during assembly. During operation lip 414 facilitates preventing back flow of oil towards flange 402 as described in more detail in FIG. 5 and acts as a rabbet structurally centering seal shield member 306 to a mating component.

Figure 5:
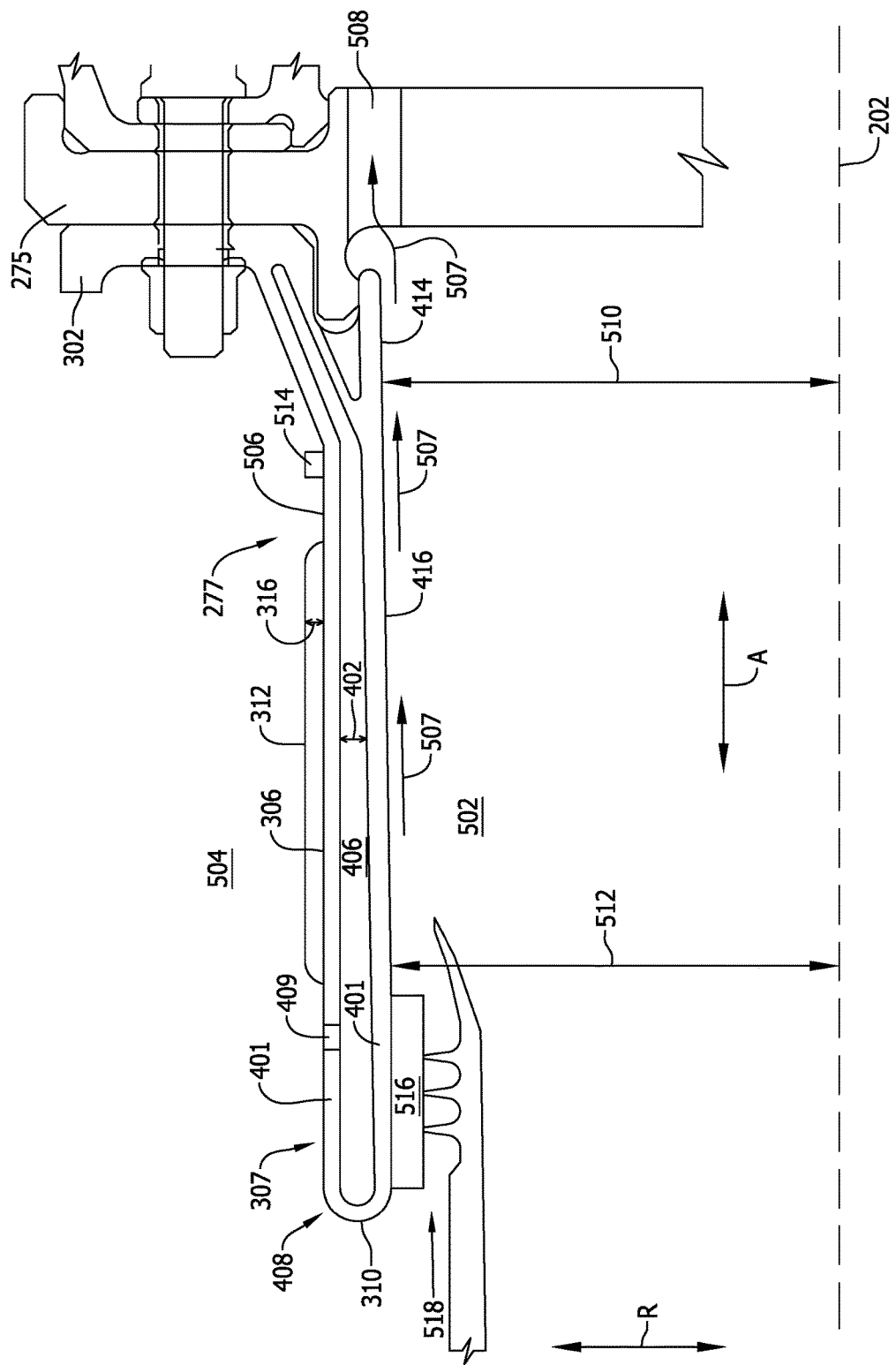
FIG. 5 is a side elevation view of the seal shield (shown in FIG. 2) in accordance with an example embodiment of the present disclosure.

FIG. 5 is a side elevation view of seal shield 277 in accordance with an example embodiment of the present disclosure. In the example embodiment, separates a relatively cooler sump space 502 from a relatively hotter turbine space 504. Because a radially outer surface 506 faces and is in contact with relatively hotter turbine space 504, and surface 416 faces and is contact with relatively cooler sump space 502, seal shield 277 experiences deformation due to temperature transients and the differential expansion of the material of seal shield 277 that accompany the temperature changes and centrifugal forces while rotating. With radially outer surface 506 being relatively hot and surface 416 being relatively cold, outer surface 506 tends to expand a greater amount than surface 416. The expansion of radially outer surface 506 tends to cause features 312 to stretch in axial direction A and also to elongate circumferentially.

Radially inner surface 416 may be wetted with oil if oil is leaking from the sump cavity. The oil is directed into a drain opening 508 through LP shaft 236, rather than being allowed to flow along surface 416 to flange 402. Surface 416 is formed with an aft diameter 510 of seal shield 277 greater than a forward diameter 512 of seal shield 277. The inclination of surface 416 is configured to centrifugally pump a flow 507 accumulated oil along surface 416 through a drain opening 508, thereby preventing back flow to flange 302.

Surface features 312 are tunable to improve a windage effect of surface features 312. Windage is typically not desirable with respect to flow through engine sumps and your cavities. However, the windage associated with seal shield 277 is tunable to reduce dynamic effect or dynamic and acoustic effect provided by surface features 312. If extra flow, pressure, and/or delta pressure are needed, surface features 312 can be modified dimensionally or by orientation to act as pumps. Moreover, additional features 514 may be added to surface features 312 or surface 506. Such additional features may be embodied in scoops or paddles formed integrally, as by an additive manufacturing process, with seal shield 277.

Seal shield member 306 is configured to receive a labyrinth seal honeycomb facing 516 that may be bonded to, adhered to, or formed with surface 416 proximate distal end 307 of seal shield member 306. Labyrinth seal honeycomb facing 516 forms a portion of a labyrinth seal 518 configured to minimize a flow of fluid between sump space 502 and turbine space 504. Notably, in the example embodiment, seal shield 277 does not include a damper for modifying the vibratory mode of seal shield 277 during operation. Surface features are configured to provide sufficient stiffness to seal shield 277 to push most of the mode outside of the operating range. It should also be noted that, in one embodiment, seal shield 277 is supported solely by flange 302 and that contact at labyrinth seal 518 and the friction fit at lip 414 are not supportive of seal shield 277.

Figure 6:
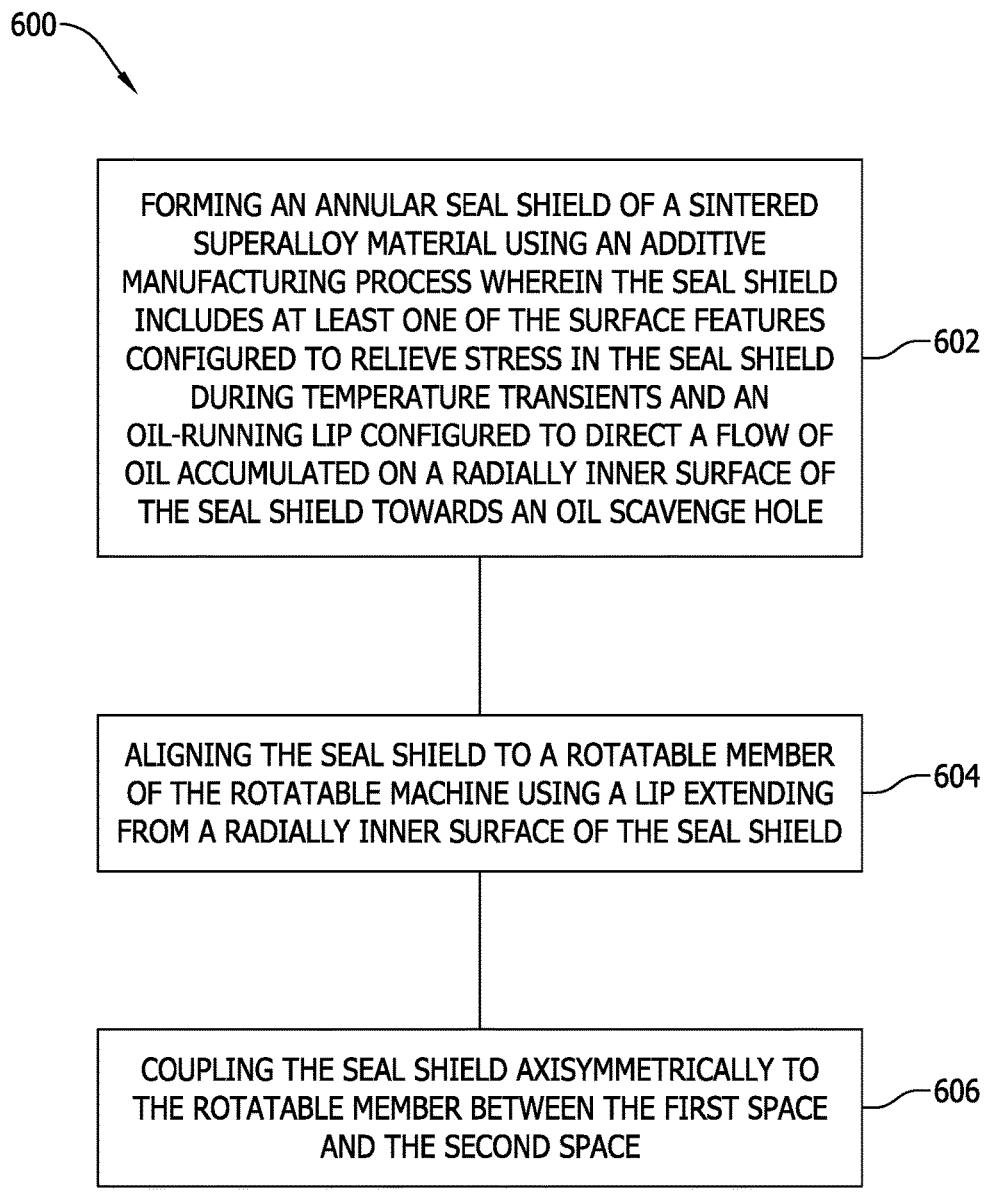
FIG. 6 is a flow diagram of a method of reducing a flow of fluid and heat between a first space and a second space in a rotatable machine.

FIG. 6 is a flow diagram of a method 600 of reducing a flow of fluid and heat between a first space and a second space in a rotatable machine. In the example embodiment, the method includes forming 602 an annular seal shield of a sintered superalloy material using an additive manufacturing process, the seal shield including at least one of surface features configured to relieve stress in the seal shield during temperature gradients and an oil-running lip configured to direct a flow of oil accumulated on a radially inner surface of the seal shield towards an oil drain opening 508. Method 600 further includes aligning 604 the seal shield to a rotatable member of the rotatable machine using a lip extending from a radially inner surface of the seal shield and coupling 606 the seal shield axisymmetrically to the rotatable member between the first space and the second space.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An integral seal and heat shield device for use in a rotatable machine including a rotatable member having a longitudinal axis of rotation, said seal and heat shield device comprising:
    an annular radially extending flange configured to couple to the rotating member of the rotatable machine;
    a multi-walled seal shield member extending axially from said flange, said multi-walled seal shield member formed integrally with said flange, said multi-walled seal shield member comprising:
        a first wall comprising a plurality of surface features;
        a second wall spaced radially inwardly with respect to said first wall, said second wall configured to direct a flow of fluid to a drain opening; and
        a cavity formed between said first and second walls; and
    a cap end integrally formed and configured to seal said first and second walls,
    each of said flange, said seal shield member, and said cap end being formed of a sintered metal.

2. The device of claim 1, wherein each of said flange, said seal shield member, and said cap end are formed of at least one of a metallic powder and a metallic wire fused in layers from a first starting end to a second finishing end.

3. The device of claim 1, wherein said second wall comprises a surface divergent in an aft axial direction and configured to direct a flow of oil along said divergent surface and away from said forward cap end.

4. The device of claim 3, wherein said rotatable machine comprises a gas turbine engine and said rotatable member comprises a turbine shaft, said second wall comprising an aft extending lip configured to engage the turbine shaft in a friction fit engagement.

5. The device of claim 4, wherein said flange is configured to couple to said turbine shaft.

6. The device of claim 1, wherein said plurality of surface features comprise at least one of a radially outwardly extending ridge, a radially inwardly extending trough, and a combination of ridges and troughs.

7. The device of claim 1, wherein at least some of said plurality of surface features are skewed with respect to the longitudinal axis by an angle greater than or equal to 0° and less than 90°.

8. The device of claim 7, further comprising one or more secondary surface features configured to modify a windage effect of said surface features.

9. The device of claim 1, further comprising a seal facing coupled to a surface of said seal shield member.

10. The device of claim 9, further comprising a labyrinth seal honeycomb facing coupled to said surface of said seal shield member.

11. The device of claim 1, wherein said cavity is at least one of sealed under vacuum and sealed containing an insulative fluid.

12. The device of claim 1, wherein said cavity is at least one of vented and purged using an aperture through at least one of a wall of said of said multi-walled seal shield member and said connection flange.

13. The device of claim 12, wherein said cavity is purged from a compressed air source.

14. The device of claim 1, wherein said divergent surface includes a first inner diameter at an axially aft position and a second inner diameter at an axially forward position, said first inner diameter being greater than said second inner diameter.

15. The device of claim 1, wherein said each of said flange, said seal shield member, and said cap end is formed of a continuous piece of sintered material.

16. The device of claim 1, wherein each of said flange, said seal shield member, and said cap end being formed of at least one of a high-temperature alloy, cobalt chrome and an austenite nickel-chromium-based superalloy.

17. A method of reducing a flow of fluid and heat between a first space and a second space in a rotatable machine, said method comprising:
forming an annular seal shield of a sintered superalloy material using an additive manufacturing process, the seal shield including at least one of surface features configured to relieve stress in the seal shield during temperature transients and an oil-running lip configured to direct a flow of oil accumulated on a radially inner surface of the seal shield towards an oil drain opening;
aligning the seal shield to a rotatable member of the rotatable machine using a lip extending from a radially inner surface of the seal shield;
coupling the seal shield axisymmetrically to the rotatable member between the first space and the second space.

18. The method of claim 17, further comprising coupling a sealing face to the seal shield, the sealing face configured to engage a non-rotatable complementary sealing device.

19. The method of claim 18, wherein forming an annular seal shield comprises forming the annular seal shield with at least some of the surface features aligned at an angle of between 0° and 89° with respect to the axis of rotation.

20. The method of claim 17, wherein forming an annular seal shield comprises forming the annular seal shield with the surface features circumferentially-spaced and aligned at an angle with respect to an axis of rotation of the rotatable member.

21. A gas turbine engine comprising:
a core engine including a multistage compressor, a combustor, and a high pressure (HP) turbine coupled in serial flow relation;
a low pressure turbine configured to receive combustion exhaust gases from said core engine; and
a seal and heat shield device positioned between a relatively low temperature space and a relatively high temperature space within said gas turbine engine, said seal and heat shield device comprising:
an annular radially extending flange configured to couple to the rotating member of the rotatable machine;
a multi-walled seal shield member extending axially from said flange, said multi-walled seal shield member formed integrally with said flange, said multi-walled seal shield member comprising:
a first wall comprising a plurality of surface features;
a second wall spaced radially inwardly with respect to said first wall, said second wall configured to direct a flow of fluid to a drain opening; and
a cavity formed between said first and second walls; and
a cap end integrally formed and configured to seal said first and second walls,
each of said flange, said seal shield member, and said cap end being formed of a sintered metal.

* * * * *